United States Patent [19]
Harrah et al.

[11] 4,405,487
[45] Sep. 20, 1983

[54] COMBINATION MOISTURE AND HYDROGEN GETTER

[76] Inventors: Larry A. Harrah, Albuquerque; Keith E. Mead, Peralta, both of N. Mex.; Henry M. Smith, Overland Park, Kans., granted to U.S. Department of Energy under the provisions of 42 U.S.C. 2182

[21] Appl. No.: 373,076

[22] Filed: Apr. 29, 1982

[51] Int. Cl.³ ............................ C01B 3/56; H01J 7/18; B01D 53/34
[52] U.S. Cl. .................................. 252/194; 55/74; 55/387; 252/181.2; 252/181.7; 252/184; 423/226; 423/230; 423/245; 423/248; 445/55
[58] Field of Search .................. 252/181.2, 181.7, 184, 252/194; 55/74, 387; 423/226, 230, 245, 248; 445/55

[56] References Cited
U.S. PATENT DOCUMENTS

| | | | |
|---|---|---|---|
| 1,798,862 | 3/1931 | Baker | 252/194 |
| 2,863,926 | 12/1958 | Carpenter | 252/194 |
| 3,214,381 | 10/1965 | Baldauf et al. | 252/181.7 |
| 3,348,919 | 10/1967 | Shumway | 423/657 |
| 3,896,042 | 7/1975 | Anderson et al. | 252/184 |
| 3,963,826 | 6/1976 | Anderson et al. | 423/248 |
| 4,000,246 | 12/1976 | Walles | 252/181.7 |

*Primary Examiner*—Irwin Gluck
*Attorney, Agent, or Firm*—Armand McMillan; Albert Sopp; Richard G. Besha

[57] ABSTRACT

A combination moisture and hydrogen getter comprises
(a) a moisture getter comprising a readily oxidizable metal; and
(b) a hydrogen getter comprising (i) a solid acetylenic compound and (ii) a hydrogenation catalyst. A method of scavenging moisture from a closed container uses the combination moisture and hydrogen getter to irreversibly chemically reduce the moisture and chemically bind the resultant hydrogen.

23 Claims, No Drawings

COMBINATION MOISTURE AND HYDROGEN GETTER

The U.S. Government has rights in this invention pursuant to Contract No. DE-AC04-76DP00789 between the U.S. Department of Energy and Western Electric Company.

BACKGROUND OF THE INVENTION

This invention relates to a combination moisture and hydrogen getter composition, and a method for scavenging moisture in a closed container during storage or service.

It is often desirable to prevent the possibility of moisture accumulation or condensation in closed containers during long periods of storage or service, especially sealed electronic and mechanical component containers. Most desiccants used for such purposes, e.g., molecular sieves, require a desiccant activation procedure, e.g., heating at 300° F. for 48 hours at less than 10 torr, and the desiccant must therefore be activated apart from the apparatus. Furthermore, the apparatus itself requires expensive procedures to keep all parts dry after assembly of the activated desiccant. One procedure involves activating the desiccant, bonding the desiccant to the empty container, welding the container to the lid that carries the electronic assembly, potting the assembly with rigidizing foam and finally purging, back filling and pinching off a closure.

It is known, e.g., from U.S. Pat. No. 3,348,919, that finely divided aluminum, zinc, iron or copper metal react with liquid water at room temperature and atmospheric pressure in the presence of a catalytic amount of an alkali metal salt of a polyaminocarboxylic acid metal chelating agent. It is also known, e.g., from U.S. Pat. No. 1,798,862, that metal particles may be combined with a hygroscopic halogen salt of a metal in a desiccant composition, the function of the metallic particles being to provide heat of reaction to increase the hygroscopic qualities of the metal halide.

A need continues to exist for an efficient material which will scavenge moisture from a closed container but which does not have the disadvantages of requiring high temperature activation.

OBJECTS OF THE INVENTION

One object of the present invention is to provide a combination moisture and hydrogen getter which will remove small amounts of moisture in a closed container and prevent the possibility of moisture accumulation and condensation during long periods of storage or service.

Another object of the present invention is to provide a combination moisture and hydrogen getter composition which does not require a high temperature activation and which does not require extensive precautions to avoid contact with moisture during assembly procedures.

A further object of the present invention is to provide a combination moisture and hydrogen getter which can be conveniently formulated and which can be readily formed into pellets having a high capacity for moisture removal.

Yet another object of the present invention is to provide a method for scavenging moisture in a closed container wherein the moisture is removed chemically and the resultant hydrogen is chemically bound, thereby substantially irreversibly removing the moisture.

Upon further study of the specification and appended claims, further objects and advantages of this invention will become apparent to those skilled in the art.

SUMMARY OF THE INVENTION

These and other objects of the present invention are achieved by a combination moisture and hydrogen getter composition, comprising:
 (a) a moisture getter comprising a readily oxidizable metal; and
 (b) a hydrogen getter comprising (i) a solid acetylenic compound and (ii) a hydrogenation catalyst.

In a method of use aspect, the present invention provides a method of scavenging moisture and/or hydrogens from a closed container, comprising introducing into the interior of said container an amount of the foregoing composition sufficient to chemically reduce the moisture and to chemically bind the resultant hydrogen.

DETAILED DISCUSSION

The combination moisture and hydrogen getter composition of the present invention achieves the removal of moisture from an enclosed space by first chemically reducing the moisture by reaction with a readily oxidizable metal, thereby generating hydrogen. The hydrogen is then chemically combined with an acetylenic compound, in the presence of a hydrogenation catalyst, to produce a reduced material having either olefinic or saturated carbon-carbon bonds resulting from hydrogenation of the acetylenic triple bond. The oxygen from the water is normally retained in combination with the oxidized metal, as the oxide or hydroxide.

Illustrative of the process by which water is removed according to the present invention is its reaction with zinc metal to generate hydrogen, followed by reaction of the hydrogen with 1,4-diphenylbutadiyne, which can occur in up to four stages, with successive reductions of the triple and resultant double bonds. This reaction sequence is shown in Scheme I.

SCHEME I (a) 

(b) 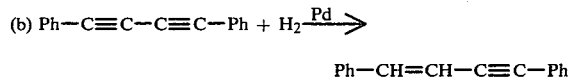

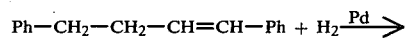

The first component of the composition of the invention is a moisture getter comprising a readily oxidizable metal. Suitable such metals include zinc, aluminum, iron and magnesium, in order of preference. In general, the metal should not be highly reactive such as sodium, potassium, lithium, and the like, but must also not be so unreactive as to require excessively high temperatures or moisture concentrations in order to react. Metals having similar redox potentials (standard oxidation potential relative to hydrogen in water within the range of about 0.049 to 1.86) to the aforementioned, and being capable of combining with water at temperatures as low as 0° C. and as high as about 100° C. will be suitable equivalents to those metals specifically disclosed hereinabove.

Advantageously, the metal is provided in a form wherein the surface to volume ratio is high, so that a maximum amount of the metal surface may be exposed to moisture and available for reaction. The metal is preferably in the form of powder or flakes, preferably powder. Powdered metal having particle diameters in the range of about 1–10 microns are advantageously used, especially aluminum or zinc powder having particles of about 1 micron in diameter.

Variation in the size of the metal particles may be used to control the rate of moisture gettering, the smaller particles gettering faster because of their higher surface to volume ratio. The 1–10 micron Al or Zn particles are well suited to gettering at a rate sufficient to avoid moisture accumulation but slow enough that the powder can be handled in air, e.g., for about 2–6 hours, without excessive reaction, e.g., loss of less than about 5% of activity, or risk of pyrophoric behavior. Zinc is preferred because it is relatively easy to obtain free of oxide on its surface and does not oxidize in air to an unacceptable level during normal processing times.

Formulation of the composition of the invention is facilitated by incorporating the metal into an organic carrier, e.g., polyethylene, polystyrene-terminated block copolymers, e.g., styrene/isobutylene block copolymers, e.g., Shell Krayton G or XX, or any moldable rubber or rubber-like polymer substantially free of amide or amine N and of S, elements that tend to inactivate the hydrogenation catalysts. The carrier should be inert, readily softened and blended, and should have a good diffusion coefficient for moisture when solidified in combination with the metal particles. It is convenient to incorporate about 10% by volume or less of metal into the carrier, either by melt blending, solution blending in a solvent conventional for the polymer, followed by evaporation, and/or by mixing the solid polymer powder and metal powder and hot pressing in a pellet mold.

Where the easily oxidizable metal has substantial amounts of oxide coating, activation of the metal in a reducing atmosphere may be necessary, to clean the surface. Alternatively, metal which has been comminuted or otherwise prepared in a form having a high surface to volume ratio in an inert atmosphere will be employed, and will preferably be incorporated in an organic carrier before exposure to the ambient atmosphere. Where the acetylenic compound to be used in the hydrogen getter is a soft solid, the metal reducing component can be incorporated directly into the acetylenic compound, optionally in the melt, together with catalyst.

The amount of the metal component in the composition should be sufficient to reduce the moisture concentration in the closed container in which it is to be used to a vapor pressure lower than 10 torr, preferably lower than 1 torr. The dew point within the container is desirably sufficiently low so that liquid water never condenses, i.e., the dew point should be less than 0° C. A dew point as low as $-100°$ C. is theoretically possible.

The hydrogen getter component of the composition of the present invention comprises an acetylenic compound and a hydrogenation catalyst. The acetylenic compound can be any acetylenic compound which is stable in the temperature range in which it is designed to be used and which reacts with hydrogen in the presence of a suitable catalyst sufficiently fast to avoid an undesirable buildup in the level of hydrogen in the container. Excessive accumulation of hydrogen is often dangerous if the container also contains air, and is especially dangerous if the container houses operating electrical equipment. Furthermore, high strength metals such as beryllium-copper alloys and martensitic steels can be embrittled by hydrogen, so that its accumulation should generally be avoided.

Another consideration relating to the choice of the acetylenic compound is the desirability in many applications of avoiding the possibility of hydrolytic release of corrosive and/or toxic by-products. For example, 1,6-diphenoxy-2,4-hexadiyne produces some phenol as a by-product of hydrogen gettering. This is unacceptable in certain applications.

It is also preferable for the acetylenic compound to be a solid at temperatures of at least about 70° C., preferably at least about 80° C., and for the hydrogenation products of the acetylenic compound to also be solids at these temperatures. Otherwise, pellets of the combined moisture and hydrogen getter composition of the invention will tend to flow and contaminate other elements and containers in which they are used for moisture removal. Thus, while 1,8-cyclotetradecadiyne showed excellent gettering rates in a formulation prepared by combining three parts by weight diyne to one part by weight of a 5% Pd on activated carbon catalyst, the hydrogenated product was a very low viscosity liquid. On the other hand, 1,4-diphenylbutadiyne (DPB), having a melting point of 87° C. produced a hydrogenation product which remained solid at room temperature. Furthermore, only inert by-products such as benzene, toluene and xylene were detected in the hydrogenation of DPB.

Acetylenic hydrocarbons, as opposed to acetylenic compounds which also have hetero atoms in their molecular structure, reduce the likelihood that undesirable by-products will be generated hydrolytically. Ether and ester functions are acceptable but N and S functions are likely to generate products that will inactivate the catalysts. Poly-ynes can have higher hydrogen binding capacity per gram and may be more likely to be solids than lower molecular weight mono-ynes.

The choice of acetylenic compound will be determined at least in part by the commercial availability, the cost, the hydrogen capacity per gram and the rate of hydrogenation, as well as the physical characteristics such as stability, melting point and the melting point of the hydrogenation products. At the present time, DPB is a preferred species for this purpose.

A hydrogenation catalyst is combined with the acetylenic compounds in the hydrogen getter component. Any of the many conventional hydrogenation catalysts known to the art may be used in this combination. Suitable such catalysts include, e.g., palladium, platinum or rhodium catalysts. In principle, the catalyst may also be a homogeneous catalyst, e.g., tris(triphenylphosphine)rhodium chloride, tetrakis(triphenylphosphine)palladium, and the like. However, these catalysts are also highly sensitive to oxygen and moisture and would be impractical in the present composition.

The catalyst may be supported, although this is not mandatory. It is desirable to use a support which does not add excessive weight and which does not retain excessive amounts of moisture. While conventional catalyst supports, e.g., alumina, calcium carbonate, kieselguhr, and the like, may be used, it is preferable to use activated carbon for the reasons just noted. A preferred catalyst is palladium on carbon, especially 5–10% Pd/C.

The ratio of the acetylenic compound to the catalyst will be determined by the desired rate of hydrogenation and the activities of the acetylenic compound and the catalyst. Advantageously, the ratio acetylenic/catalyst is about 1:10–10:1. The rate of hydrogenation should be sufficiently rapid to avoid accumulation of hydrogen in the container. A hydrogen gettering rate of at least about $2 \times 10^{-6}$ cc-atm/sec is desirable, with a rate of about $10^{-3}$ cc-atm/sec being preferred. Because it is advantageous to use solid compositions, the amount of catalyst may be higher than would ordinarily be used in a liquid phase hydrogenation, to insure intimate contact of the catalyst with the acetylenic compound. An effective hydrogen getter formulation may be prepared by combining about 75 weight percent of DPB and about 25 weight percent of 5% Pd/C.

It is advantageous to separately purge the acetylenic compound and the catalyst, the latter at higher temperature, with an inert gas, e.g., nitrogen, to remove traces of water and carbon dioxide. For ease of formulation, it is advantageous to blend the acetylenic compound and the catalyst, preferably in the melt, under an inert atmosphere, and to grind and sieve the cooled, solidified blend to form particles, preferably in the size range of about 100 mesh.

The metal moisture getter, optionally incorporated in an organic carrier, is combined with the hydrogen getter component to form the final composition according to the invention. Sufficient acetylenic compound should be present to chemically combine with all of the hydrogen which can be theoretically liberated by the reducing metal component to avoid accumulation of hydrogen in the system. Using a 75/25 wt/wt DPB/5%Pd/C hydrogen getter, at least about 0.36 g Al/g and about 1.36 g Zn/g of the hydrogen getter are preferably employed.

Advantageously, the metal and the hydrogen getter are pressed together into pellet form, for convenience in incorporating the composition of the invention within a closed container. Of course, particles of each of the components may be combined and placed in a porous receptacle, e.g., a "tea bag", or the components can be separately packaged, although this arrangement is less efficient. It is preferable to produce an intimate mixture of the reducing metal moisture getter and the hydrogen getter to avoid diffusing hydrogen to the surfaces of other materials in the container.

The combination moisture and hydrogen getter according to the invention is effective in removing and preventing the accumulation of residual moisture in a closed container. It has the advantage that no high temperature activation is needed and the relatively slow reaction of the reducing metal with water means that few if any precautions need be taken to exclude moisture from either the apparatus to be sealed or the gettering composition itself prior to closure of the two within a container.

The composition according to the invention will extract residual moisture from the interior of the container until the residual moisture level or the dew point is reduced to the desired value, and will maintain the dry conditions during prolonged periods of storage or use. The proper choice of the reducing metal, catalyst and acetylenic compound will result in a composition which can effect moisture reduction in a variety of gaseous atmospheres useful in certain applications. The proper choice of components will also avoid the production of deleterious by-products, and can insure that the composition of the invention remains stable and in solid form throughout the course of moisture removal.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Preparation of the Hydrogen Getter

30 Parts of 1,4-diphenylbutadiyne (DPB), purchased from Farchan Division of Story Chemical Corporation, were purged with nitrogen for 24 hours at 60° C. 10 parts of 5% palladium on activated carbon, purchased from Aldrich Chemical Company, were purged with nitrogen for 48 hours at 230° C. The purged DPB was melted in a beaker, with stirring in a glove box under nitrogen at 90°–95° C. and the catalyst was added to the melt and stirred to achieve a homogeneous blend. The blend was cooled, solidified, ground and sieved to produce 60–100 mesh particles having a composition of about 75% by weight DPB and 25% by weight catalyst. The water content of the blend was about 0.03%.

A portion of the DPB/catalyst particles were separately formed into pellets about 0.25 in. long and about 0.125 in. in diameter, in a pellet press, for testing the hydrogen gettering kinetics.

EXAMPLE 2

Hydrogen Gettering Kinetics

Pellets of the hydrogen getter, as prepared in Example 1 were loaded into two FEP tubes, in an amount of about 5.7 grams per tube. The ends of each tube were closed with polypropylene plugs, and each tube had one 0.25 mm hole through the tube wall near the center of the tube length. The tubes were each placed in identical reactors of 207 cc volume for the gettering kinetics experiments. One reactor was back-filled with helium to a pressure of 250 mm Hg, and the other reactor was back-filled with a gas mixture comprising 10% by volume methane, 1% by volume trimethylamine, 260 ppm acetonitrile, the balance being helium, at the same pressure.

Hydrogen gas was admitted to each of the reactors at known flow rates until a slow pressure increase was observed, and the rate of hydrogen gettering was determined. The maximum observed rate exceeded $1.5 \times 10^{-3}$ cc-atm/sec. The observed rate was almost 3 orders of magnitude greater than the rate of $2 \times 10^{-6}$ cc-atm/sec which is the desirable minimum rate for efficient hydrogen uptake in this type of system.

The kinetic experiments were terminated after gettering of 700-1200 cc-atm hydrogen had occurred. Gas analysis of the atmosphere in each reactor by gas chromatography/mass spectrometry revealed trace amounts of benzene and ethylbenzene. Carbon dioxide, which was apparently adsorbed on the carbon catalyst, was also detected. When the reactors were opened, it was found that the hydrogenated DPB was still solid. It was also observed that hydrogenation had occurred only on those pellets near the ends of the tube, and near the hole in the middle of the tube.

Carbon-hydrogen analysis comfirmed these observations, indicating those pellets near the end and middle had reacted to approximately 97% completion, while those further away from the initial contact with the hydrogen gas had not reacted with hydrogen at all. This indicates that the maximum gettering rate observed was in fact the maximum rate at which hydrogen could leak into the tubes. The actual gettering rate of the pellets is considerably faster than this mechanically imposed limit.

Gel permeation chromatography indicated that no polymerization of DPB had occurred during hydrogenation. Gas chromatography of the pellets showed trace amounts of toluene (40 ppm), ethylbenzene (120 ppm) and m-xylene (150 ppm).

The degree of hydrogenation of the DPB was greater in the reactor containing the pure helium atmosphere than in the reactor containing the gas mixture. On the other hand, the second reactor containing the gas mixture revealed a decrease in the trimethylamine concentration after hydrogenation.

An analogous test was effected with a 75/25 wt/wt mixture of 1,6-diphenoxy-2,4-hexadiyne (DPH) and 5% palladium on alumina. In this case, the hydrogenation products were liquid, the gettering rate was slower, and about 3.2% phenol was generated as a by-product of the hydrogen gettering process. While this system may be acceptable for some applications, the DPB getter composition is preferred for those applications where a solid material is required throughout and where the generation of phenol would be unacceptable.

EXAMPLE 3

Preparation of the Combination Getter Composition

20 Parts of 1 micron aluminum powder or 75 parts of 1 micron zinc powder, 25 parts of Arco S113 high density polyethylene powder, and 55 parts of 60-100 mesh particles of a 75/25 wt/wt blend of DPB and 5% Pd/C, as prepared in Example 1, were blended, and pelleted in a pellet press, at room temperature and 8,000-12,000 psi pressure, to form pellets about 0.25 in. long and about 1 in. in diameter, weighing about 2 grams each.

Alternatively, the metal powder and polymer powder can be blended and hot pressed at about 1,000 psi in a pellet mold at about 100° C. The resultant particles can then be blended with the hydrogen getter particles and pelleted.

The combination getter composition was effective in scavenging moisture from sealed containers during prolonged storage and/or use.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

I claim:
1. A combination moisture and hydrogen getter composition, comprising:
   (a) a moisture getter comprising a readily oxidizable metal and characterized by having standard oxidation potential relative to hydrogen in water within the range of about 0.049 to 1.86; and
   (b) a hydrogen getter comprising (i) a solid acetylenic compound and (ii) a hydrogenation catalyst.
2. The composition of claim 1, wherein said metal is aluminum or zinc.
3. The composition of claim 1, wherein said metal is in the form of a powder having an average particle diameter of about 1-10 microns.
4. The composition of claim 1, wherein the solid acetylenic compound has a melting point of 80° C. or higher.
5. The composition of claim 4, wherein the solid acetylenic compound is a hydrocarbon diyne.
6. The composition of claim 5, wherein the solid acetylenic compound is 1,4-diphenylbutadiyne.
7. The composition of claim 1, wherein the hydrogenation catalyst is a noble metal catalyst.
8. The composition of claim 7, wherein the noble metal is palladium.
9. The composition of claim 7, wherein the catalyst is supported on a solid carrier.
10. The composition of claim 9, wherein the catalyst support is activated carbon.
11. The composition of claim 10, wherein the catalyst is 1-10% palladium on activated carbon.
12. The composition of claim 1, wherein the weight ratio of the solid acetylenic compound to the catalyst is 1:10-10:1.
13. The composition of claim 12, wherein said weight ratio is about 3:1.
14. The composition of claim 1, wherein the ratio of the hydrogen getter to the moisture getter is at least the stoichiometric ratio.
15. The composition of claim 14, wherein said ratio is about 1:1.
16. The composition of claim 11, wherein the hydrogen getter is a blend of about 75 weight percent 1,4-diphenylbutadiyne and about 25 weight percent 5% palladium on activated carbon.
17. The composition of claim 2, wherein the aluminum or zinc powder has a particle size of about 1-10 microns.
18. The composition of claim 17, wherein the aluminum or zinc powder is incorporated into an inert solid organic carrier.
19. The composition of claim 18, wherein said organic carrier is polyethylene.
20. The composition of claim 19, wherein the hydrogen getter is a blend of about 75 weight percent 1,4-diphenylbutadiyne and about 25 weight percent 5% palladium on activated carbon.
21. The composition of claim 20, wherein the weight ratio of the hydrogen getter to the moisture getter is about 0.36 g Al/g getter or about 1.36 g Zn/g getter.
22. The composition of claim 21, wherein the particles of moisture getter and hydrogen getter are pelleted together to produce pellets.
23. A method of scavenging moisture in a closed container during storage or service, comprising introducing into the interior of said container an amount of the composition of any of claims 1, 2, 6, 11, 16 or 20 sufficient to chemically reduce said moisture and to chemically bind the resultant hydrogen.

* * * * *